United States Patent
Wang et al.

(10) Patent No.: US 9,774,327 B1
(45) Date of Patent: Sep. 26, 2017

(54) BRIDGED IMBALANCE PUF UNIT CIRCUIT AND MULTI PUF CIRCUITS

(71) Applicant: Ningbo University, Zhejiang (CN)

(72) Inventors: Pengjun Wang, Zhejiang (CN); Haoyu Qian, Zhejiang (CN); Weiwei Chen, Zhejiang (CN)

(73) Assignee: Ningbo University, Zhejiang (CN)

( * ) Notice: Subject to any disclaimer, the term of this patent is extended or adjusted under 35 U.S.C. 154(b) by 0 days.

(21) Appl. No.: 15/441,270

(22) Filed: Feb. 24, 2017

(30) Foreign Application Priority Data

Mar. 25, 2016 (CN) .......................... 2016 1 0178862

(51) Int. Cl.
*H03K 19/00* (2006.01)
*H03K 19/003* (2006.01)

(52) U.S. Cl.
CPC .............................. *H03K 19/00315* (2013.01)

(58) Field of Classification Search
None
See application file for complete search history.

(56) References Cited

U.S. PATENT DOCUMENTS

| 2012/0072476 A1* | 3/2012 | Bucci | .................... H01L 23/544 |
| | | | 708/270 |
| 2014/0327469 A1* | 11/2014 | Pfeiffer | ................ H03K 19/003 |
| | | | 326/8 |
| 2016/0182045 A1* | 6/2016 | Mai | .......................... G09C 1/00 |
| | | | 326/8 |

\* cited by examiner

*Primary Examiner* — Anh Tran
(74) *Attorney, Agent, or Firm* — Jianq Chyun IP Office

(57) ABSTRACT

The present invention discloses a bridge imbalance PUF unit circuit and multi PUF circuits; the bridge imbalance PUF unit circuit comprises a four-arm bridge unit circuit and a contrast output unit circuit; the multi PUF circuits comprise a timing controller, a row decoder, a column decoder, a memory array, a row output circuit and a column output circuit; each memory unit in the memory array comprises a bridge imbalance PUF unit circuit and 4 NMOS tubes; the present invention features in higher randomness that is up to 51.8% at the supply voltage of 1.2V under the temperature of 25° C.

4 Claims, 3 Drawing Sheets

BRIDGED IMBALANCE PUF UNIT CIRCUIT AND MULTI PUF CIRCUITS

CROSS-REFERENCE TO RELATED APPLICATION

This application claims the priority benefit of China application serial no. 201610178862.2, filed on Mar. 25, 2016. The entirety of the above-mentioned patent application is hereby incorporated by reference herein and made a part of this specification.

BACKGROUND OF THE INVENTION

Field of the Invention

The present invention is related to a PUF circuit, in particular to a bridge imbalance PUF circuit and multi PUF circuits.

Description of Related Art

As an important performance indicator for PUF (Physical Unclonable Functions) circuit, randomness may seriously affect the safety of application system; in particular, safety of encryption algorithm is to be determined by the encryption randomness when output response of PUF circuit is applied to the encryption algorithm.

SUMMARY OF THE INVENTION

The technical issue to be settled by the present invention is to provide a bridge imbalance PUF unit circuit of higher randomness.

Technical solutions used by the present invention to settle aforesaid technical issue are stated as follows: A bridge imbalance PUF unit circuit, comprising a four-arm bridge unit circuit and a constrast output unit circuit; the said four-arm bridge unit circuit comprises the 1st, the 2nd, the 3rd, the 4th and the 5th NMOS tubes; drain of the 1st NMOS tube, grid of the 1st NMOS tube, grid of the 2nd NMOS tube and source of the 2nd NMOS tube are connected to the power supply; drain of the 2nd NMOS tube, grid of the 4th NMOS tube, drain of the 4th NMOS tube and drain of the 5th NMOS tube are connected to the grid of the 5th NMOS tube, and the connecting terminal is the 1st output terminal of the said four-arm bridge unit circuit; source of the 1st NMOS tube, drain of the 3rd NMOS tube and grid of the 3rd NMOS tube are connected to the source of the 5th NMOS tube, and the connecting terminal is the 2nd output terminal of the said four-arm bridge unit circuit; source of the 4th and 3rd NMOS tubes is grounded; the said contrast output unit circuit comprises the 1st, the 2nd, the 3rd, the 4th, the 6th, the 7th, the 8th, the 9th and the 10th PMOS tubes; source of the $1^{st}$, the $2^{nd}$, the $3^{rd}$ and the $4^{th}$ PMOS tubes is connected to the power supply respectively; grid of the $1^{st}$ and the $4^{th}$ NMOS tubes is connected to the grid of the $6^{th}$ NMOS tube, and the connecting terminal is the enabling terminal of the said bridge imbalance PUF unit circuit; drain of the $1^{st}$ and $2^{nd}$ PMOS tubes, grid of the $3^{rd}$ PMOS tube and drain of the $9^{th}$ NMOS tube are connected to the grid of the $10^{th}$ NMOS tube, and the connecting terminal is the output terminal of the said bridge imbalance PUF unit circuit; grid of the $2^{nd}$ PMOS tube, drain of the $3^{rd}$ PMOS tube, drain of the $4^{th}$ PMOS tube and grid of the $9^{th}$ NMOS tube are connected to the drain of the $10^{th}$ NMOS tube, and the connecting terminal is the inverted output terminal of the said bridge imbalance PUF unit circuit; source of the $9^{th}$ NMOS tube is connected to the drain of the $7^{th}$ NMOS tube; source of the $10^{th}$ NMOS tube is connected to the drain of the $8^{th}$ NMOS tube; grid of the $7^{th}$ NMOS tube is connected to the $1^{st}$ output terminal of the said four-arm bridge unit circuit; grid of the $8^{th}$ NMOS tube is connected to the $2^{nd}$ output terminal of the said four-arm bridge unit circuit; source of the $7^{th}$ and the $8^{th}$ NMOS tubes is connected to the drain of the $6^{th}$ NMOS tube; source of the $6^{th}$ NMOS tube is grounded.

As compared with prior arts, the bridge imbalance PUF unit circuit of the present invention is characterized by the contrast output unit circuit in the structure of voltage type sense amplifier; when the contrast output unit circuit is in operation, PUF unit circuit will start to evaluate and output response signal; as parameters for the $1^{st}$, the $2^{nd}$, the $3^{rd}$ and the $4^{th}$ NMOS tubes in the four-arm bridge unit circuit are different due to deviations to production techniques, voltage signal $V_A$ from the $1^{st}$ output terminal is unequal to voltage signal $V_B$ from the $2^{nd}$ output terminal of the four-arm bridge unit circuit; the contrast output unit circuit will produce unpredictable output response signal through comparison of voltage signal $V_A$ and $V_A$; the present invention has a higher randomness of 51.8% (ideal randomness is 50%) at the supply voltage of 1.2V under the temperature of 25° C.

The second technical issue to be settled by the present invention is to provide a bridge imbalance multi PUF circuits of higher randomness.

Technical solutions as used by the present invention to settle the second technical issue are stated as follows: A bridge imbalance multi PUF circuit, comprising a timing controller, a row decoder, a column decoder, a memory array, a row output circuit and a column output circuit; the timing controller is connected to the row decoder, column decoder, memory array, row output circuit and column output circuit respectively; the said memory array comprises $2^n \times 2^n$ memory units arranged in the matrix of $2^n$ rows×$2^n$ columns; wherein n is an integral equal to or over 1; the said memory unit comprises a bridge imbalance PUF unit circuit and 4 NMOS tubes; the said bridge imbalance PUF circuit comprises a four-arm bridge unit circuit and a contrast output unit circuit; the said four-arm bridge unit circuit comprises the 1st, the 2nd, the 3rd, the 4th and the 5th NMOS tubes; drain of the 1st NMOS tube, grid of the 1st NMOS tube, grid of the 2nd NMOS tube and source of the 2nd NMOS tube are connected to the power supply; drain of the 2nd NMOS tube, grid of the 4th NMOS tube, drain of the 4th NMOS tube, drain of the 5th NMOS tube are connected to the grid of the 5th NMOS tube, and the connecting terminal is the 1st output terminal of the said four-arm bridge unit circuit; source of the 1st NMOS tube, drain of the 3rd NMOS tube and grid of the 3rd NMOS tube are connected to the source of the 5th NMOS tube, and the connecting terminal is the 2nd output terminal of the said four-arm bridge unit circuit; source of the 4th and 3rd NMOS tubes is grounded; the said contrast output unit circuit comprises the 1st, the 2nd, the 3rd, the 4th, the 6th, the 7th, the 8th, the 9th and the 10th PMOS tubes; source of the 1st, the 2nd, the 3rd and the 4th PMOS tubes is connected to the power supply respectively; grid of the 1st and the 4th PMOS tubes is connected to the grid of the 6th NMOS tube, and the connecting terminal is the enabling terminal of the said bridge imbalance PUF unit circuit; drain of the 1st and the 2nd PMOS tubes, grid of the 3rd PMOS tube and drain of the 9th NMOS tube are connected to the grid of the 10th NMOS tube, and the connecting terminal is the output terminal of the said bridge imbalance PUF unit circuit; grid of the 2nd PMOS tube, drain of the 3rd PMOS tube, drain of the 4th PMOS tube and grid of the 9th NMOS tube are connected to the drain of the 10th NMOS tube, and the connecting terminal is the inverted output terminal of the said bridge imbalance PUF unit circuit; source of the 9th NMOS tube is connected to the drain of the 7th NMOS tube; source of the 10th NMOS tube is connected to the drain of the 8th NMOS tube; grid of the 7th NMOS tube is connected to the 1st output terminal of the said four-arm bridge unit circuit; grid of the 8th NMOS tube is connected to the 2nd output terminal of the said four-arm bridge unit circuit; source of the 7th and the 8th NMOS tubes is connected to the drain of the 6th NMOS tube; source of the 6th NMOS tube is grounded; the 4 NMOS tubes comprise the 11th, the 12th, the 13th and the 14th NMOS tubes; grid of the 12th NMOS tube is connected to the output terminal of the said bridge imbalance PUF unit circuit; source of the 12th NMOS tube is grounded; drain of the 12th NMOS tube is connected to the drain of the 11th NMOS tube; grid of the 11th NMOS tube is the row signal reading input terminal of the said memory unit; source of the 11th NMOS tube is the 1st output terminal of the said memory unit; grid of the 13th NMOS tube is connected to the inverted output terminal of the said bridge imbalance PUF unit circuit; source of the 13th NMOS tube is grounded; drain of the 13th NMOS tube is connected to the drain of the 14th NMOS tube; grid of the 14th NMOS tube is the column signal reading input terminal of the said memory unit; source of the 14th NMOS tube is the 2nd output terminal of the said memory unit; enabling terminal of the said bridge imbalance PUF unit circuit is the enabling terminal of the said memory unit; row signal reading input terminal of $2^n$ memory units in row j is connected, and the connecting terminal is the row j signal reading input terminal of the said memory array; column signal reading input terminal of $2^n$ memory units in column j is connected, and the connecting terminal is the column j signal reading input terminal of the said memory array; the 1st output terminal of $2^n$ memory units in row j is connected, and the connecting terminal is the row j output terminal of the said memory array; the 2nd output terminal of $2^n$ memory units in column j is connected, and the connecting terminal is the column j output terminal of the said memory array: j=1, '2' ... $2^n$; enabling terminal of $2^n \times 2^n$ memory units is connected, and the connecting terminal is the enabling terminal of the said memory array; enabling terminal of the said memory array is connected to the said timing controller; the $1^{st}$ row signal reading input terminal~the $2^n$ row signal reading input terminal in the said memory array is connected to the said row decoder respectively; the $1^{st}$ column signal reading input terminal~the $2^n$ column signal reading input terminal in the said memory array is connected to the said column decoder respectively; the $1^{st}$ row output terminal~the $2^n$ row output terminal of the said memory array is connected to the said output circuit respectively; the 1st column output terminal~the $2^n$ row output terminal of the said memory array is connected to the said output circuit respectively.

The said row output circuit comprises $2^n$ output unit circuits; the said row output unit circuit comprises the 5th and the 6th PMOS tubes and the 1st inverter; source of the said 5th and the 6th PMOS tubes are connected to the power supply; grid of the 5th PMOS tube is the enabling terminal of the said row output unit circuit; drain of the 5th and the 6th PMOS tubes is connected to the input terminal of the 1st inverter, and the connecting terminal is the output terminal of the said row output unit circuit; output terminal of the 1st inverter is connected to the grid of the 6th PMOS tube; enbaling terminal of $2^n$ row output unit circuits is connected, and the connecting terminal is the enabling terminal of the said row output circuit; enabling terminal of the said row output circuit is connected to the said timing controller; row j output terminal of the said memory array is connected to the row output unit circuit at the position.

As compared with prior arts, the bridge imbalance PUF unit circuit of the present invention is characterized by the contrast output unit circuit in the structure of voltage type sense amplifier; when the contrast output unit circuit is in operation, PUF unit circuit will start to evaluate and output response signal; as parameters for the $1^{st}$, the $2^{nd}$, the $3^{rd}$ and the $4^{th}$ NMOS tubes in the four-arm bridge unit circuit are different due to deviations to production techniques, voltage signal $V_A$ from the $1^{st}$ output terminal is unequal to voltage signal $V_B$ from the $2^{nd}$ output terminal of the four-arm bridge unit circuit; the contrast output unit circuit will produce unpredictable output response signal through comparison of voltage signal $V_A$ and $V_A$; the present invention has a higher randomness of 51.8% at the supply voltage of 1.2V under the temperature of 25° C.

BRIEF DESCRIPTION OF THE DRAWINGS

FIG. 1 (b) is simulation result chart of the present invention in normal environment.
FIG. 1 (c) shows average randomness of Output Logic 1 of the present invention at different voltages.

DESCRIPTION OF THE EMBODIMENTS

Figure 1:
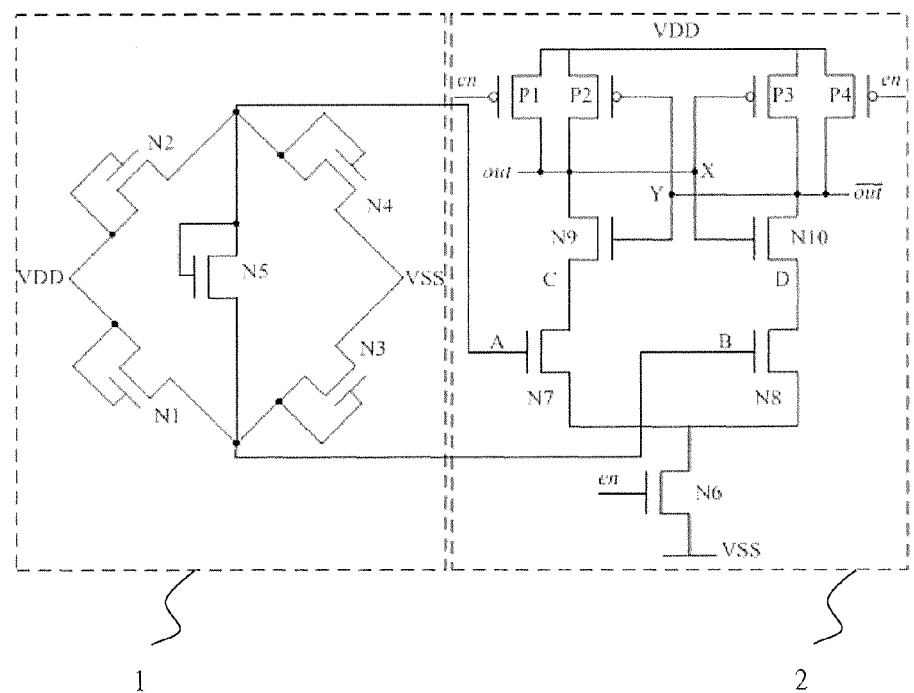
FIG. 1 (a) is the circuit diagram of the present invention.
Figure 1:
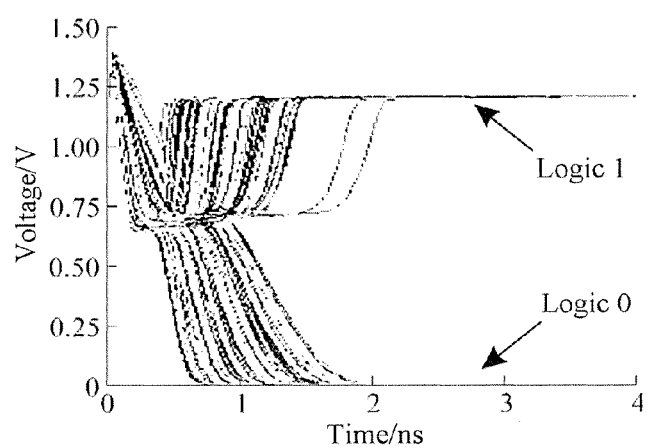
Figure 1:
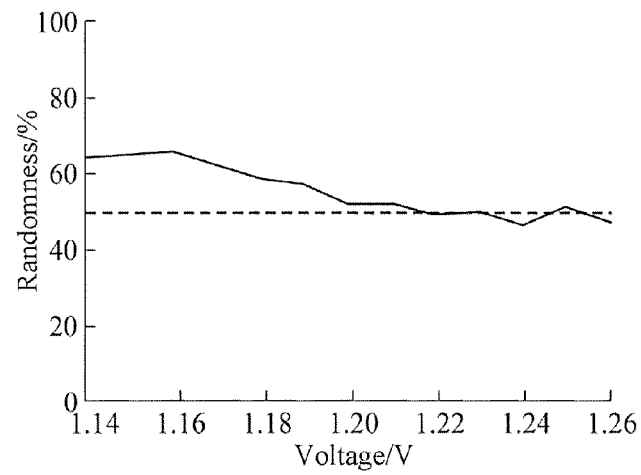

Reference will now be made in detail to the present preferred embodiments of the invention, examples of which are illustrated in the accompanying drawings. Wherever possible, the same reference numbers are used in the drawings and the description to refer to the same or like parts.

The bridge imbalance PUF unit circuit of the present invention is further described as follows in combination with drawings and embodiments:

Embodiment

A bridge imbalance PUF unit circuit as shown in FIG. 1 (a), comprising a four-arm bridge unit circuit 1 and a constrast output unit circuit 2; the four-arm bridge unit circuit 1 comprises the 1st NMOS tube N1, the 2nd NMOS tube N2, the 3rd NMOS tube N3, the 4th NMOS tube N4 and the 5th NMOS tube N5; drain of the 1st NMOS tube N1, grid of the 1st NMOS tube N1, grid of the 2nd NMOS tube N2 and source of the 2nd NMOS tube N2 are connected to the power supply; drain of the 2nd NMOS tube N2, grid of the 4th NMOS tube N4, drain of the 4th NMOS tube N4 and the drain of the 5th NMOS tube N5 are connected to the grid of the 5th NMOS tube N5, and the connecting terminal is the 1st output terminal of the four-arm bridge unit circuit; source of the 1st NMOS tube N1, drain of the 3rd NMOS tube N3 and grid of the 3rd NMOS tube N3 is connected to the source of the 5th NMOS tube N5, and the connecting terminal is the 2nd output terminal of the four-arm bridge unit circuit; source of the 4th NMOS N4 and the 3rd NMOS tube N3 is grounded; the contrast output unit circuit 2 comprises the 1st PMOS tube P1, the 2nd PMOS tube P2, the 3rd PMOS tube P3, the 4th PMOS tube P4, the 5th PMOS tube P5, the 6th PMOS tube P6, the 7th PMOS tube P7, the 8th PMOS tube P8, the 9th PMOS tube P9 and the 10th PMOS tube P10; source of the 1st PMOS tube P1, the 2nd PMOS tube P2, the 3rd PMOS tube P3 and the 4th PMOS tube P4 are connected to the power supply; grid of the 1st PMOS tube P1 and the 4th PMOS tube P4 is connected to the grid of the 6th NMOS tube N6, and the connecting terminal is the enabling terminal of the bridge unbalance PUF unit circuit; drain of the 1st PMOS tube P1 and the 2nd PMOS tube P2, grid of the 3rd PMOS tube P3 and drain of the 9th NMOS tube N9 are connected to the grid of the 10th NMOS tube N10, and the connecting terminal is the output terminal of the bridge imbalance PUF unit circuit; grid of the 2nd PMOS tube P2, drain of the 3rd PMOS tube P3, drain of the 4th PMOS tube P4 and grid of the 9th NMOS tube N9 are connected to the drain of the 10th NMOS tube N10, and the connecting terminal is the inverted output terminal of the bridge imbalance PUF unit circuit; source of the 9th NMOS tube N9 is connected to the drain of the 7th NMOS tube N7; source of the 10th NMOS tube N10 is connected to the drain of the 8th NMOS tube N8; grid of the 7th NMOS tube N7 is connected to the 1st output terminal of the four-arm bridge unit circuit; grid of the 8th NMOS tube N8 is connected to the 2nd output terminal of the four-arm bridge unit circuit; source of the 7th NMOS tube N7 and source of the 8th NMOS tube N8 are connected to the drain of the 6th NMOS tube N6; source of the 6th NMOS tube is grounded.

Results of Monte Carlo simulation (N=128, k=5) of the present invention in normal environment (voltage is 1.2V, and temperature is 25° C.) are as shown in FIG. 1 ($b$), and the average randomness calculated then is 51.8%. FIG. 1($c$) shows average randomness of output logic 1 of the present invention at different voltage (1.20±0.05) with maximum and minimum value up to 65.8% and 46.4% respectively; as indicated by aforesaid results, the present invention has higher randomness in different voltage environments.

The bridge imbalance multi PUF circuits of the present invention are further described as follows in combination with drawings and embodiments:

Embodiment

Figure 2:
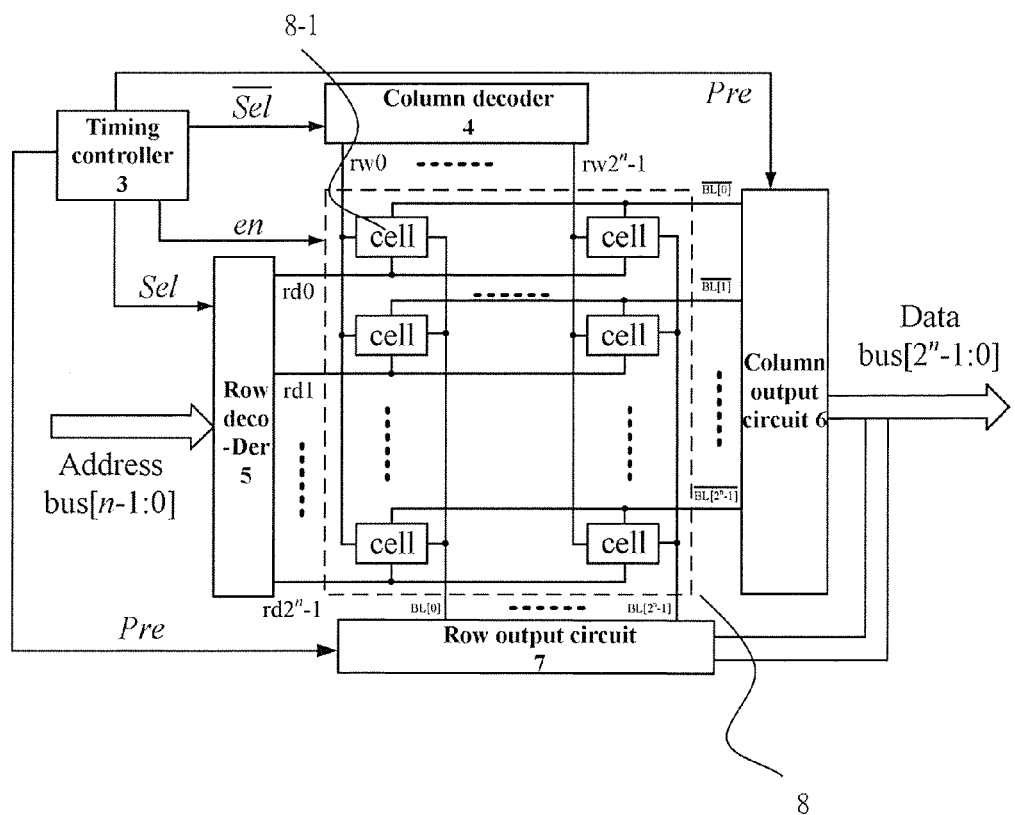
FIG. 2 is the structural diagram of the present invention.
Figure 3:
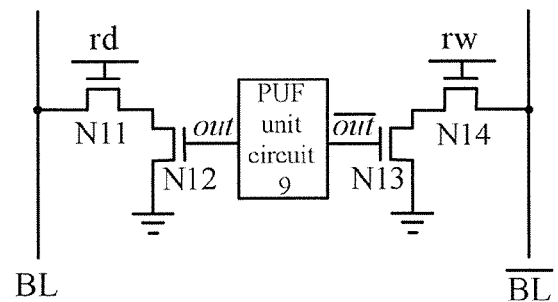
FIG. 3 is the circuit diagram for the memory unit of the present invention.

A bridge imbalance multi PUF circuit as shown in FIG. 1 ($a$), FIG. 2 and FIG. 3, comprising a timing controller 3, a row decoder 5, a column decoder 4, a memory array 8, a row output circuit 7 and a column output circuit 6; the timing controller 3 is connected to the row decoder 5, column decoder 4, memory array 8, row output circuit 7 and column output circuit 6 respectively; the said memory array 8 comprises $2^n \times 2^n$ memory units 8-1 arranged in the matrix of $2^n$ rows×$2^n$ columns; wherein n is an integral equal to or over 1; the said memory unit 8-1 comprises a bridge imbalance PUF unit circuit 9 and 4 NMOS tubes; the said bridge imbalance PUF circuit 9 comprises a four-arm bridge unit circuit 1 and a contrast output unit circuit 2; the said four-arm bridge unit circuit 1 comprises the 1st NMOS tube N1, the 2nd NMOS tube N2, the 3rd NMOS tube N3, the 4th NMOS tube N4 and the 5th NMOS tube N5; drain of the 1st NMOS tube N1, grid of the 1st NMOS tube N1, grid of the 2nd NMOS tube N2 and source of the 2nd NMOS tube N2 are connected to the power supply; drain of the 2nd NMOS tube N2, grid of the 4th NMOS tube N4, drain of the 4th NMOS tube N4 and drain of the 5th NMOS tube N5 are connected to the grid of the 5th NMOS tube N5, and the connecting terminal is the 1st output terminal of the said four-arm bridge unit circuit 1; source of the 1st NMOS tube N1, drain of the 3rd NMOS tube N3 and grid of the 3rd NMOS tube N3 are connected to the source of the 5th NMOS tube N5, and the connecting terminal is the 2nd output terminal of the said four-arm bridge unit circuit; source of the 4th NMOS tube N4 and the 3rd NMOS tube N3 is grounded; the said contrast output unit circuit 2 comprises the 1st PMOS tube P1, the 2nd PMOS tube P2, the 3rd PMOS tube P3, the 4th PMOS tube P4, the 6th PMOS P6, the 7th PMOS tube P7, the 8th PMOS tube P8, the 9th PMOS tube P9 and the 10th PMOS tube P10; source of the 1st PMOS tube P1, the 2nd PMOS tube P2, the 3rd PMOS tube P3 and the 4th PMOS tube P4 is connected to the power supply respectively; grid of the 1st PMOS tube P1 and the 4th PMOS tube P4 is connected to the grid of the 6th NMOS tube P6, and the connecting terminal is the enabling terminal of the said bridge imbalance PUF unit circuit 9; drain of the 1st PMOS tube P1 and the 2nd PMOS tube P2, grid of the 3rd PMOS tube P3 and drain of the 9th NMOS tube N9 are connected to the grid of the 10th NMOS tube N10, and the connecting terminal is the output terminal of the said bridge imbalance PUF unit circuit 9; grid of the 2nd PMOS tube P2, drain of the 3rd PMOS tube P3, drain of the 4th PMOS tube P4 and grid of the 9th NMOS tube N9 are connected to the drain of the 10th NMOS tube N10, and the connecting terminal is the inverted output terminal of the said bridge imbalance PUF unit circuit 9; source of the 9th NMOS tube N9 is connected to the drain of the 7th NMOS tube N7; source of the 10th NMOS tube N10 is connected to the drain of the 8th NMOS tube N8; grid of the 7th NMOS tube N7 is connected to the 1st output terminal of the said four-arm bridge unit circuit 1; grid of the 8th NMOS tube N8 is connected to the 2nd output terminal of the said four-arm bridge unit circuit 1; source of the 7th NMOS tube N7 and the 8th NMOS tube N8 is connected to the drain of the 6th NMOS tube N6; source of the 6th NMOS tube N6 is grounded; the 4 NMOS tubes comprise the 11th NMOS tube N11, the 12th NMOS tube N12, the 13th NMOS tube N13$h$ and the 14th NMOS tube N14; grid of the 12th NMOS tube N12 is connected to the output terminal of the said bridge imbalance PUF unit circuit 9; source of the 12th NMOS tube N12 is grounded; drain of the 12th NMOS tube N12 is connected to the drain of the 11th NMOS tube N11; grid of the 11th NMOS tube N11 is the row signal reading input terminal of the said memory unit 8-1; source of the 11th NMOS tube N11 is the 1st output terminal of the said memory unit 8-1; grid of the 13th NMOS tube N13 is connected to the inverted output terminal of the said bridge imbalance PUF unit circuit 9; source of the 13th NMOS tube N13 is grounded; drain of the 13th NMOS tube N13 is connected to the drain of the 14th NMOS tube N14; grid of the 14th NMOS tube N14 is the column signal reading input terminal of the said memory unit 8-1; source of the 14th NMOS tube N14 is the 2nd output terminal of the said memory unit 8-1; enabling terminal of the said bridge imbalance PUF unit circuit 9 is the enabling terminal of the said memory unit 8-1; row signal reading input terminal of $2^n$ memory units 8-1 in row j is connected, and the connecting terminal is the row j signal reading input terminal of the said memory array 8; column signal reading input terminal of $2^n$ memory units 8-1 in column j is connected, and the connecting terminal is the column j signal reading input terminal of the said memory array 8; the 1st output terminal of $2^n$ memory units 8-1 in row j is connected, and the connecting terminal is the row j output terminal of the said memory array 8; the 2nd output terminal of $2^n$ memory units 8-1 in column j is connected, and the connecting terminal is the column j output terminal of the said memory array 8: j=1 '2' ... $2^n$; enabling terminal of $2^n \times 2^n$ memory units 8-1 is connected, and the connecting terminal is the enabling terminal of the said memory array 8; enabling terminal of the said memory array 8 is connected to the said timing controller 3; the row signal reading input terminal~the $2^n$ row signal reading input terminal in the said memory array 8 is connected to the said row decoder 5 respectively; the $1^{st}$ column signal reading input terminal~the $2^n$ column signal reading input terminal in the said memory array 8 is connected to the said column decoder 4 respectively; the row output terminal~the $2^n$ row output terminal of the said memory array 8 is connected to the said row output circuit 7 respectively; the 1st column output terminal~the $2^n$ column output terminal of the said memory array 8 is connected to the said column output circuit 6 respectively.

Figure 4:
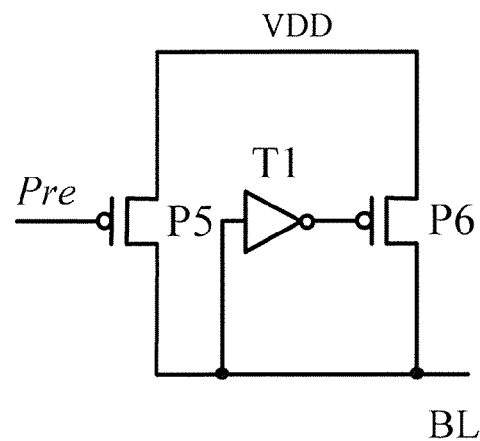
FIG. 4 is the circuit diagram for the row output unit circuit of the present invention.

As shown in FIG. 4, the row output circuit 7 in this embodiment comprises $2^n$ output unit circuits; the row output unit circuit comprises the 5th PMOS tube P5, the 6th PMOS tube P6 and the 1st inverter T1; source of the 5th PMOS tube P5 and the 6th PMOS tube P6 is connected to the power supply; grid of the 5th PMOS tube P5 is the enabling terminal of the row output unit circuit; drain of the 5th PMOS tube P5 and the 6th PMOS tube P6 is connected to the input terminal of the 1st inverter T1, and the connecting terminal is the output terminal of the row output unit circuit; output terminal of the 1st inverter T1 is connected to the grid of the 6th PMOS tube P6; enbaling terminal of the $2^n$ output unit circuits is connected, and the connecting terminal is the enabling ten al of the row output circuit 7; enabling terminal of the row output circuit 7 is connected to the timing controller 3; row j output terminal of the memory array 8 is connected to the row output unit circuit at position.

Figure 5:
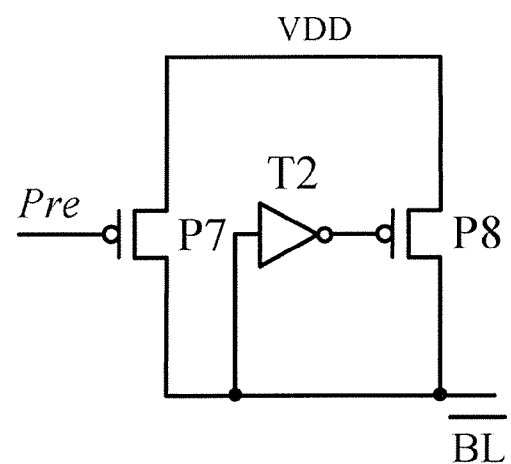
FIG. 5 is the circuit diagram for the row output unit circuit of the present invention.

As shown in FIG. 5, the column output circuit 6 in this embodiment comprises $2^n$ output unit circuits; the column output unit circuit comprises the 7th PMOS tube P7, the 8th PMOS tube P8 and the 2nd inverter T2; source of the 7th PMOS tube P7 and the 8th PMOS tube P8 is connected to the power supply; grid of the 7th PMOS tube P7 is the enabling terminal of the column output unit circuit; drain of the 7th PMOS tube P7 and the 8th PMOS tube P8 is connected to the input terminal of the 2nd inverter T2, and the connecting terminal is the output terminal of the column output unit circuit; output terminal of the 2nd inverter T2 is connected to the grid of the 8th PMOS tube P8; emabling terminal of the $2^n$ column output unit circuits is connected, and the connecting terminal is the enabling terminal of the column output circuit 6; enabling terminal of the column output circuit 6 is connected to the timing controller 3; column j output terminal of the memory array 8 is connected to the column output unit circuit at position.

In this embodiment, timing controller 3, row decoder 5 and column decoder 4 are well-established products in the technical field.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bridge imbalance PUF unit circuit, comprising a four-arm bridge unit circuit and a contrast output unit circuit, wherein the said four-arm bridge unit circuit comprises a $1^{st}$, a $2^{nd}$, a $3^{rd}$, a $4^{th}$ and a $5^{th}$ NMOS tubes; drain of the $1^{st}$ NMOS tube, grid of the $1^{st}$ NMOS tube, grid of the $2^{nd}$ NMOS tube and source of the $2^{nd}$ NMOS tube are connected to the power supply; drain of the $2^{nd}$ NMOS tube, grid of the $4^{th}$ NMOS tube, drain of the $4^{th}$ NMOS tube and drain of the $5^{th}$ NMOS tube are connected to the grid of the $5^{th}$ NMOS tube, and the connecting terminal is the $1^{st}$ output terminal of the said four-arm bridge unit circuit; source of the $1^{st}$ NMOS tube, drain of the $3^{rd}$ NMOS tube and grid of the $3^{rd}$ NMOS tube are connected to the source of the $5^{th}$ NMOS tube, and the connecting terminal is the $2^{nd}$ output terminal of the said four-arm bridge unit circuit; source of the $4^{th}$ and $3^{rd}$ NMOS tubes is grounded, the said contrast output unit circuit comprises a $1^{st}$, a $2^{nd}$, a $3^{rd}$, a $4^{th}$, a $5^{th}$, a $6^{th}$, a $7^{th}$, a $8^{th}$, a $9^{th}$ and a $10^{th}$ PMOS tubes; source of the $1^{st}$, the $2^{nd}$, the $3^{rd}$ and the $4^{th}$ PMOS tubes is connected to the power supply respectively; grid of the $1^{st}$ and the $4^{th}$ NMOS tubes is connected to the grid of the $6^{th}$ NMOS tube, and the connecting terminal is the enabling terminal of the said bridge imbalance PUF unit circuit; drain of the $1^{st}$ and $2^{nd}$ PMOS tubes, grid of the $3^{rd}$ PMOS tube and drain of the $9^{th}$ NMOS tube are connected to the grid of the $10^{th}$ NMOS tube, and the connecting terminal is the output terminal of the said bridge imbalance PUF unit circuit; grid of the $2^{nd}$ PMOS tube, drain of the $3^{rd}$ PMOS tube, drain of the $4^{th}$ PMOS tube and grid of the $9^{th}$ NMOS tube are connected to the drain of the $10^{th}$ NMOS tube, and the connecting terminal is the inverted output terminal of the said bridge imbalance PUF unit circuit; source of the $9^{th}$ NMOS tube is connected to the drain of the $7^{th}$ NMOS tube; source of the $10^{th}$ NMOS tube is connected to the drain of the $8^{th}$ NMOS tube; grid of the $7^{th}$ NMOS tube is connected to the $1^{st}$ output terminal of the said four-arm bridge unit circuit; grid of the $8^{th}$ NMOS tube is connected to the $2^{nd}$ output terminal of the said four-arm bridge unit circuit; source of the $7^{th}$ and the $8^{th}$ NMOS tubes is connected to the drain of the $6^{th}$ NMOS tube; source of the $6^{th}$ NMOS tube is grounded.

2. A bridge imbalance multi PUF circuit, comprising a timing controller, a row decoder, a column decoder, a memory array, a row output circuit and a column output circuit, wherein the timing controller is connected to the row decoder, column decoder, memory array, row output circuit and column output circuit respectively; the said memory array comprises $2^n \times 2^n$ memory units arranged in the matrix of $2^n$ rows×$2^n$ columns; wherein n is an integral equal to or over 1; the said memory unit comprises a bridge imbalance PUF unit circuit and 4 NMOS tubes; the said bridge imbalance PUF circuit comprises a four-arm bridge unit circuit and a contrast output unit circuit; the said four-arm bridge unit circuit comprises a $1^{st}$, a $2^{nd}$, a $3^{rd}$, a $4^{th}$ and a $5^{th}$ NMOS tubes; drain of the $1^{st}$ NMOS tube, grid of the $1^{st}$ NMOS tube, grid of the $2^{nd}$ NMOS tube and source of the $2^{nd}$ NMOS tube are connected to the power supply; drain of the $2^{nd}$ NMOS tube, grid of the $4^{th}$ NMOS tube, drain of the $4^{th}$ NMOS tube and drain of the $5^{th}$ NMOS tube are connected to the grid of the $5^{th}$ NMOS tube, and the connecting terminal is the 1st output terminal of the said four-arm bridge unit circuit; source of the $1^{st}$ NMOS tube, drain of the $3^{rd}$ NMOS tube and grid of the $3^{rd}$ NMOS tube are connected to the source of the $5^{th}$ NMOS tube, and the connecting terminal is the $2^{nd}$ output terminal of the said four-arm bridge unit circuit; source of the $4^{th}$ and $3^{rd}$ NMOS tubes is grounded; the said contrast output unit circuit comprises a $1^{st}$, a $2^{nd}$, a $3^{rd}$, a $4^{th}$, a $6^{th}$, a $7^{th}$, a $8^{th}$, a $9^{th}$ and a $10^{th}$ NMOS tubes; source of the $1^{st}$, the $2^{nd}$, the $3^{rd}$ and the $4^{th}$ PMOS tubes is connected to the power supply respectively; grid of the $1^{st}$ and the $4^{th}$ PMOS tubes is connected to the grid of the $6^{th}$ NMOS tube, and the connecting terminal is the enabling terminal of the said bridge imbalance PUF unit circuit; drain of the $1^{st}$ and the $2^{nd}$ PMOS tubes, grid of the $3^{rd}$ PMOS tube and drain of the $9^{th}$ NMOS tube are connected to the grid of the $10^{th}$ NMOS tube, and the connecting terminal is the output terminal of the said bridge imbalance PUF unit circuit; grid of the $2^{nd}$ PMOS tube, drain of the $3^{rd}$ PMOS tube, drain of the $4^{th}$ PMOS tube and grid of the $9^{th}$ NMOS tube are connected to the drain of the $10^{th}$ NMOS tube, and the connecting terminal is the inverted output terminal of the said bridge imbalance PUF unit circuit; source of the $9^{th}$ NMOS tube is connected to the source of the $7^{th}$ NMOS tube; source of the 10th NMOS tube is connected to the drain of the $8^{th}$ NMOS tube; grid of the $7^{th}$ NMOS tube is connected to the 1st output terminal of the said four-arm bridge unit circuit; grid of the $8^{th}$ NMOS tube is connected to the $2^{nd}$ output terminal of the said four-arm bridge unit circuit; source of the $7^{th}$ and the $8^{th}$ NMOS tubes is connected to the drain of the $6^{th}$ NMOS tube; source of the $6^{th}$ NMOS tube is grounded; the 4 NMOS tubes comprise a $11^{th}$, a $12^{th}$, a $13^{th}$ and a $14^{th}$ NMOS tubes; grid of the $12^{th}$ NMOS tube is connected to the output terminal of the said bridge imbalance PUF unit circuit; source of the $12^{th}$ NMOS tube is grounded; drain of the $12^{th}$ NMOS tube is connected to the drain of the $11^{th}$ NMOS tube; grid of the $11^{th}$ NMOS tube is the row signal reading input terminal of the said memory unit; source of the $11^{th}$ NMOS tube is the 1st output terminal of the said memory unit; grid of the $13^{th}$ NMOS tube is connected to the inverted output terminal of the said bridge imbalance PUF unit circuit; source of the $13^{th}$ NMOS tube is grounded; drain of the $13^{th}$ NMOS tube is connected to the drain of the $14^{th}$ NMOS tube; grid of the $14^{th}$ NMOS tube is the column signal reading input terminal of the said memory unit; source of the $14^{th}$ NMOS tube is the $2^{nd}$ output terminal of the said memory unit; enabling terminal of the said bridge imbalance PUF unit circuit is the enabling terminal of the said memory unit;

row signal reading input terminal of $2^n$ memory units in row j is connected, and the connecting terminal is the row j signal reading input terminal of the said memory array; column signal reading input terminal of $2^n$ memory units in column j is connected, and the connecting terminal is the column j signal reading input terminal of the said memory array; the $1^{st}$ output terminal of $2^n$ memory units in row j is connected, and the connecting terminal is the row j output terminal of the said memory array; the $2^{nd}$ output terminal of $2^n$ memory units in column j is connected, and the connecting terminal is the column j output terminal of the said memory array: j=1 '2' . . . $2^n$; enabling terminal of $2^n \times 2^n$ memory units is connected, and the connecting terminal is the enabling terminal of the said memory array; enabling terminal of the said memory array is connected to the said timing controller; the row signal reading input terminal~the $2^n$ row signal reading input terminal in the said memory array is connected to the said row decoder respectively; the $1^{st}$ column signal reading input terminal~the $2^n$ column signal reading input terminal in the said memory array is connected to the said column decoder respectively; the $1^{st}$ row output terminal~the $2^n$ row output terminal of the said memory array is connected to the said output circuit respectively; the $1^{st}$ column output terminal~the $2^n$ row output terminal of the said memory array is connected to the said output circuit respectively.

3. A bridge imbalance multi PUF circuit according to claim 2, wherein the said row output circuit comprises $2^n$ output unit circuits; the row output unit circuit comprises a $5^{th}$ PMOS tube, a $6^{th}$ PMOS tube and a inverter; source of the $5^{th}$ PMOS tube and the $6^{th}$ PMOS tube is connected to the power supply; grid of the $5^{th}$ PMOS tube is the enabling terminal of the row output unit circuit; drain of the $5^{th}$ PMOS tube and the $6^{th}$ PMOS tube is connected to the input terminal of the inverter, and the connecting terminal is the output terminal of the row output unit circuit; output terminal of the 1st inverter is connected to the grid of the $6^{th}$ PMOS tube; enbaling terminal of the $2^n$ output unit circuits is connected, and the connecting terminal is the enabling terminal of the row output circuit; enabling terminal of the row output circuit is connected to the timing controller; row j output terminal of the memory array is connected to the row output unit circuit at position.

4. A bridge imbalance multi PUF circuits according to claim 3, wherein the said column output circuit comprises $2^n$ output unit circuits; the column output unit circuit comprises a $7^{th}$ PMOS tube, a $8^{th}$ PMOS tube and a $2^{nd}$ inverter; source of the $7^{th}$ PMOS tube and the $8^{th}$ PMOS tube is connected to the power supply; grid of the $7^{th}$ PMOS tube is the enabling terminal of the column output unit circuit; drain of the $7^{th}$ PMOS tube and the $8^{th}$ PMOS tube is connected to the input terminal of the $2^{nd}$ inverter, and the connecting terminal is the output terminal of the column output unit circuit; output terminal of the $2^{nd}$ inverter is connected to the grid of the $8^{th}$ PMOS tube; enabling terminal of the $2^n$ column output unit circuits is connected, and the connecting terminal is the enabling terminal of the column output circuit; enabling terminal of the column output circuit is connected to the timing controller; column j output terminal of the memory array is connected to the column output unit circuit at position.

* * * * *